United States Patent [19]

Jordan et al.

[11] Patent Number: 4,984,448
[45] Date of Patent: Jan. 15, 1991

[54] LEAK DETECTOR AND UTILIZATION PRESSURE MANIFOLD

[75] Inventors: Mitchell Jordan, Pineville; James C. Mercer, Winnfield, both of La.; Charles Straughan, Lubbock; Rex D. Hudson, DeSoto, both of Tex.

[73] Assignee: Atmos Energy Corporation, Dallas, Tex.

[21] Appl. No.: 437,884

[22] Filed: Nov. 16, 1989

[51] Int. Cl.⁵ ............................................. G01M 3/28
[52] U.S. Cl. ............................................. 73/40.50 R
[58] Field of Search ................................ 73/40.5 R, 40

[56] References Cited

U.S. PATENT DOCUMENTS

| | | | |
|---|---|---|---|
| 2,353,287 | 7/1944 | Benesh | 73/40.5 R |
| 3,444,724 | 5/1969 | Gilpin | 73/40.5 R |
| 3,910,102 | 10/1975 | McLean | 73/40.5 R |
| 4,103,537 | 8/1978 | Victor | 73/40.5 R |
| 4,114,426 | 9/1978 | McLean | 73/40.5 R |

FOREIGN PATENT DOCUMENTS 2541985  3/1977  Fed. Rep. of Germany ... 73/40.5 R
247224  10/1987  Japan ............................. 73/40.5 R

*Primary Examiner*—Hezron E. Williams
*Assistant Examiner*—Joseph W. Roskos
*Attorney, Agent, or Firm*—Ross, Howison, Clapp & Korn

[57] ABSTRACT

A utilization pressure/leak detector includes two valves (28, 30) for being disposed in series between a meter (18) and a customer's riser valve (20). A gauge (24) is disposed between the two valves (28, 30) for testing utilization pressure and for leak detection. A check swivel assembly (34) is provided for interconnecting one side of the valve (28) to the meter (18). A valve (38) interfaces with an orifice (40) to provide a predetermined gas flow between the meter (18) and a valve (28) to act as a load. To test the utilization pressure, gas is provided to the meter (18) and valve (28) opened with the valve (38) also open to provide a load on the system. Valve (38) is closed to determine the lock up for the regulator (14). Leak testing is achieved by opening valve (38) to pressurize the customer's piping and then closing valve (28) observation of the gauge (24) for providing indication of a leak in the customer's piping.

13 Claims, 2 Drawing Sheets

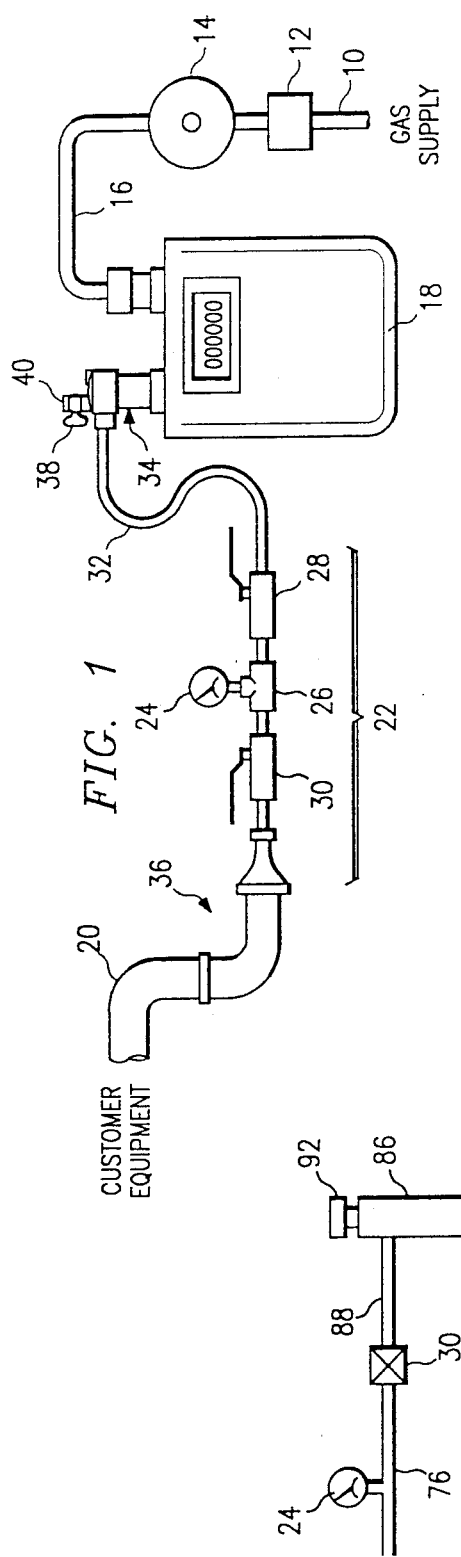
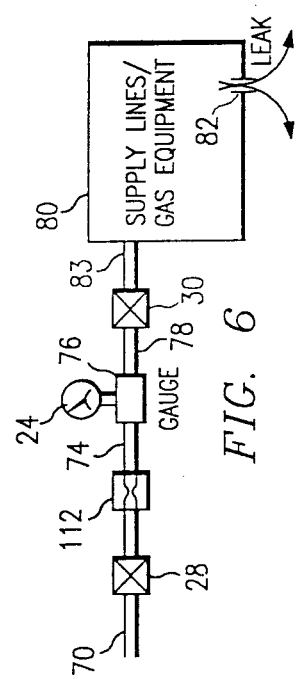
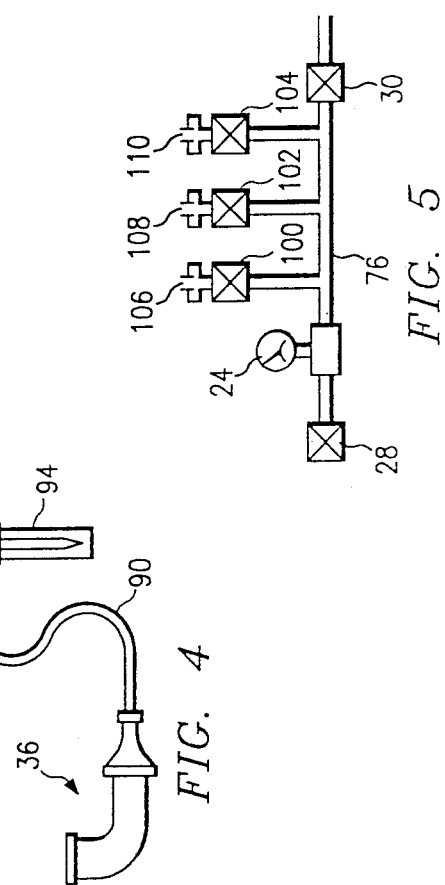
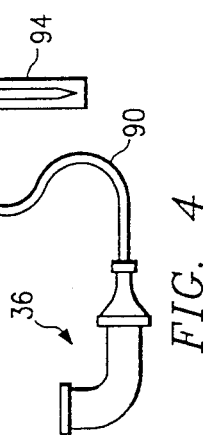

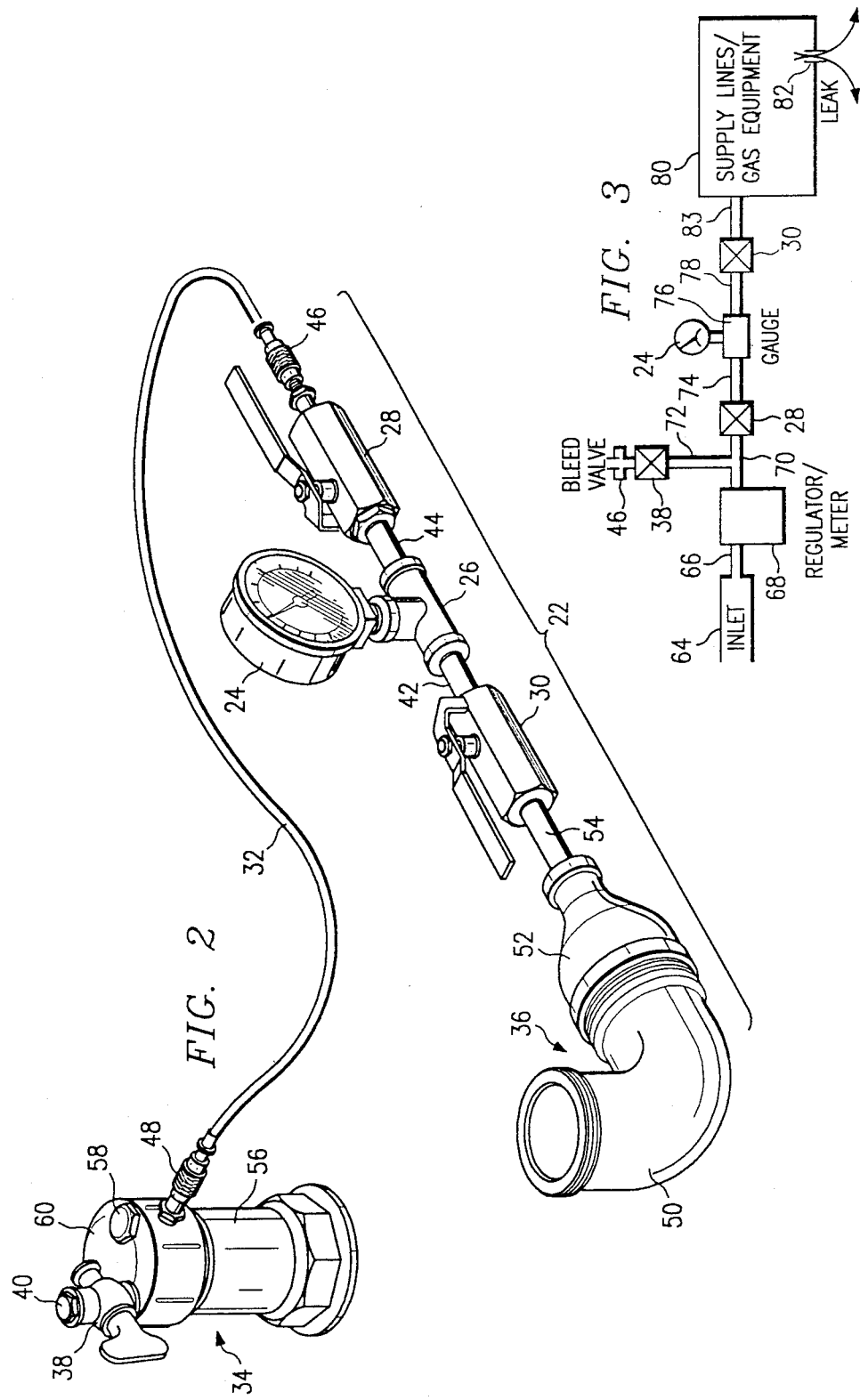

LEAK DETECTOR AND UTILIZATION PRESSURE MANIFOLD

TECHNICAL FIELD OF THE INVENTION

The present invention pertains in general to testing devices for leak detection and the such on a natural gas line, and more particularly, to devices for performing shut-in tests on residential gas lines.

BACKGROUND OF THE INVENTION

Whenever a gas company turns on the gas supply to a business or a residential customer, it is necessary to perform a number of checks to insure the integrity of the system. These tests are primarily used to verify utilization pressure, regulator lock-up and identify any leaks that may exist on the customer's piping. The utilization pressure is that pressure existing in the customer's piping during normal gas use. The regulator lock-up indicates the pressure existing in the line with minimal or no gas flow. Leaks, of course, must be eliminated except for those due to such things as pilot light orifices, etc.

In the past, utilization pressure and regulator lock-up have been tested by placing a valve and pressure gauge on the outlet to the gas meter and disconnecting the customer's piping from the gas meter. The company lock-stop valve to the meter was slowly opened, allowing gas to pass through the meter. With the lock-stop valve open, a calibrated valve adjacent the pressure gauge on the outlet of the gas meter is opened to allow approximately thirty cubic foot an hour of gas to flow therethrough. This flow of gas will open the regulator and the pressure can be noted on the pressure gauge. A set-point pressure of approximately four ounces indicates a correct setting on the indicator. If the set-point pressure is higher or lower, the regulator would then be adjusted.

After the regulator pressure was set properly, the calibrated valve was closed to prevent gas flow through the meter. The regulator will then shut the flow of gas off; a condition called lock-up. A slight increase in pressure from approximately one quarter of an ounce to one ounce may be noted above the set-point, as the regulator locks up. If the pressure rises above this, then the regulator has not locked up and it would be replaced.

When the leak test was performed in the past, it was necessary to utilize the actual gas meter to determine if there a leak was present. Typically, the gas meter was hooked up to the customer's piping and then the test hands on the face of the meter observed. Typically, the test hands measure volume in ¼ foot, ½ foot, 1 foot, 2 foot, etc., increments. The technician typically observed the ¼, ½ and 1 foot test hands for a period of approximately five minutes to determine if there had been any movement. Depending upon the local regulations for the shut-in test, a certain amount of movement will be tolerated. However, it can be appreciated that this prior leak testing method does require some type of calibration to the meter to insure that the test hands in fact move. To perform this test, a calibrated orifice is placed on the outlet to the meter and the orifice opened. This will result in a predetermined movement of the hands, thus insuring that the hands will provide an indication of low level gas flow. This is typically referred to as the "slow-fire" test. After the meter has been calibrated in this manner to assure that it operates at low gas flows, the meter would then be hooked up to the customer's piping and the hands on the face of the meter observed for any movement over a predetermined observation time.

The test procedures under present regulations and with present systems consume a considerable amount of time, as much as fifteen minutes per test. This can present a disadvantage since a flat fee is charged for a particular hook-up. Therefore, if the time for performing a given test can be reduced, significant increases in revenue can result due to the increase in efficiency. Further, present systems have some reliability problems in performing leak tests as they utilize the gas meter itself to indicate the existence of a leak. These procedures typically prove to be inadequate. Therefore, there exists a need for an improved testing system that both increases efficiency and eliminates calibration problems.

SUMMARY OF THE INVENTION

The invention disclosed and claimed herein comprises a method and apparatus for providing a set-up test procedure for a gas service that is connected to a customer's piping. An intermediate volume is provided which is operable to be placed between the customer's piping and the gas service. A pressure gauge is utilized which is used with the intermediate volume to allow pressure measurement thereof. A first valve is provided for being connected between the intermediate volume and the gas supply. The first valve is operable to be opened to allow pressurization of the intermediate volume and the customer's piping and then to be closed to isolate the intermediate volume and the customer's piping from the gas service. The meter is then observed after pressurization thereof to determine if the pressure decreases due to a leak in the isolated system. After determining if there is a leak, the intermediate volume and the pressurizing device in addition to the valve are removed and the gas service connected to the customer's piping.

In another aspect of the present invention, a second valve is provided for being disposed between the intermediate volume and the customer's piping. The first valve is open and the second valve shut to allow pressurization of the intermediate volume. An orifice of a predetermined size is interfaced with the intermediate volume and selectively turned on to provide a predetermined rate of flow from the intermediate volume. The pressure reading indicates the utilization pressure.

In yet another embodiment of the present invention, a device is provided for measuring the approximate volume of the customer's piping. Thereafter, a fluid flow meter is disposed in series with the intermediate volume in the customer's piping to allow measurement of flow rate thereto. Correlation of the flow rate with the approximate volume of the customer's piping allows a determination of the size of a leak if present.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a diagrammic view of the testing device of the present invention attached between the gas meter and the customer's piping;

FIG. 2 illustrates a perspective view of the testing device;

FIG. 3 illustrates a block diagram of the testing device with respect to the relative volumes of the customer's piping;

FIG. 4 illustrates an alternate embodiment of the testing device of the present invention utilizing a fluid flow meter;

FIG. 5 illustrates an alternate embodiment of FIG. 4 illustrating measurement of fluid flow with the pressure gauge; and FIG. 6 illustrates a second alternate embodiment of the method for measuring the fluid flow.

DETAILED DESCRIPTION OF THE INVENTION

Referring now to FIG. 1, there is illustrated a diagrammatic view of the testing device of the present invention connected between the supply line and the customer's piping. The supply of gas is received through a pipe 10 from the gas company which is interfaced with a lock stop valve 12. The lock stop valve 12 is operable to inhibit flow therethrough. The output of the lock stop valve 12 is input to a regulator 14, the output of the regulator 14 being connected to a supply side riser 16. This supply side riser 16 is operable to be connected to the inlet side of a gas meter 18. The outlet side of the gas meter 18 is operable in normal use to be connected to a customer riser 20 which is connected to the customer's piping.

In accordance with the present invention, the testing device of the present invention is comprised in part of a utilization pressure manifold. The utilization pressure manifold 22 consists generally of a pressure gauge 24 which is disposed in a tee 26. The tee has an inlet side and an outlet side with the inlet side being connected to one side of a ball valve 28 and the outlet side being connected to one side of a ball valve 30. The ball valve 28 has the other side thereof connected through a length of refrigeration hose 32 to a safety check swivel assembly 34, which comprises the remaining part of the testing device of the present invention. The safety check swivel assembly 34 is connected to the outlet side of the meter 18. The other side of the ball valve 30 is connected to an adapter 36, which connects the outlet of the ball valve 30 to the customer's riser 20.

The testing device of the present invention is operable to test the gas meter function, test the regulator function, and also test for leakage. It eliminates the need for the slow fire test to check meter operation and also to check leakage. In general, the gauge 24 in conjunction with the safety check swivel assembly 34 are operable to provide a check of the regulator function and the meter function. The pressure gauge 24 in conjunction with the ball valves 28 and 30 are utilized to provide the leak test.

Referring further to FIG. 1, the details of the testing procedure will be described in general as follows: When a service technician desires to perform the set-up and test procedure for a residential meter, it is first necessary to separate the customer riser 20 from the outlet side of the meter 18. The utilization pressure manifold 22 is then inserted therebetween with the safety check swivel assembly 34 attached on the outlet side of the meter 18 and the adapter 36 being attached to the customer riser 20. The first test to be performed is the utilization pressure. For this test, the ball valve 28 is placed in the open position and the ball valve 30 is placed in the closed position. The safety check swivel assembly 34 has a valve 38 disposed on the surface thereof which is operable to communicate between the interior of the assembly 34 and an external orifice 40. The external orifice 40 is operable to regulate gas flow to approximately thirty cubic foot an hour when the ball valve 38 is opened. For the utilization pressure test, the valve 38 is in the open position. The lock stop valve 12 is slowly opened, allowing gas to pass through the meter 18 and the regulator 14. Gas also flows out through the orifice 40 at a rate of thirty cubic foot an hour. The utilization pressure is then determined by observing the face of the gauge 24. In conventional residence meter settings, the set point pressure is approximately four ounces. If the pressure registers such, this indicates that the regulator 14 is set correctly. If the set point pressure is higher or lower, then the regulator 14 must be adjusted to provide a set at four ounces. Of course, as the regulator 14 is adjusted, the meter setting on the gauge 24 should vary.

After the regulator pressure is set properly, the valve 38 is closed and then the pressure indication on the gauge 24 observed. It is imperative that the regulator 14 shut off the flow of gas, a condition called lock-up. There will be a slight increase of pressure of between ¼ ounce to 1 ounce above the set point as the regulator locks up. If the regulator 14 does not lock-up, or if lock-up pressure is extreme, the regulator 14 must be replaced.

After the utilization pressure and the regulator function have been tested, the leak test is then performed. In this test, the ball valve 30 is opened into the customer's piping until the customer's piping has reached the preset regulator pressure. When the pressure on the customer's piping equalizes with the pressure across the meter 18, ball valve 28 is turned off. In addition, to insure a proper sealed system test, the lock-stop valve 12 is also turned off and the pressure, to the meter is let off by opening the valve 38. However, this step is not necessary as the leak test described herein can be performed with the meter pressurized.

After the customer's piping has been pressurized and the ball valve 28 has been closed, the technician observes the gauge pressure reading for a period of approximately two minutes. If the guage pressure drops within the two minute period, this indicates some type of leak. Typically, the next step will be to insure that no leak occurs between the outlet of the ball valve 28 and the inlet to the customer's riser 20. This is performed by soap testing on all fittings on the utilization pressure manifold 22 to verify that the leak is not in the installation of this device. If the leak still exists, further investigation of the customer's piping is necessary.

After observing the gauge 24 on the utilization pressure manifold 22 for the appropriate time with no detectable reduction in pressure (or within predetermined tolerances), the customer's piping is determined to be leak free. The utilization pressure manifold 22 and the safety check swivel assembly 34 are then removed from the outside of the meter 18. The customer riser 20 is then connected to the outside of meter 18.

Referring now to FIG. 2, there is illustrated a more detailed mechanical diagram of the utilization pressure manifold 22 and the safety check swivel assembly 34. In the utilization pressure manifold 22, the tee 26 is comprise of a ¼ inch tee. The ball valve 30 is connected to the tee 26 by a ¼ inch nipple 42. In a similar manner, the ball valve 28 is connected to the tee 26 by a ¼ inch nipple 44. The ball valve 28 and the ball valve 30 are both ¼ inch ball valves, with ball valve 28 being connected to the hose 32 by a ¼ inch MPTX ¼ inch flare half union 46. The hose 32 is a 36 inch length of refrigeration hose which is connected at the other end thereof to the safety check swivel assembly 34 by a flare half union 48 similar to the union 46.

The interface 36 is comprised of a 1¼ inch 30 LT curb ell 50 which has one end thereof operable to be interfaced with the customer riser 20 and the other end thereof which is threadedly engaged with a 1¼ inch×¼ inch Bell Reducer 52. The reducer 52 is connected to the ball valve 30 through a ¼ inch nipple 54.

The safety check swivel assembly 34 is comprised of a 1¼ inch meter swivel with swivel nut 56 which is operable to be interfaced with the outlet of the meter 18. A 1¼ inch schedule 80 threaded PVC cap 58 is disposed on the upper end of the swivel with swivel nut 56 and threaded to receive the flare half union 48 and also the valve 38 and an orifice 60. The valve 38 is, in the preferred embodiment, a ⅛ inch Essex #40 petcock with the orifice 40 being drilled to a #45 orifice size. The orifice 60 is an orifice that is drilled to a #71 orifice size.

Referring now to FIG. 3, there is illustrated a schematic diagram of the utilization pressure manifold 22 and safety check swivel assembly 34 illustrating the relative volumetric quantities of this system. The inlet side of the supply line is represented by a volume 64, which for all practical purposes is infinite. This is connected through the lock-stop valve 12, represented by a restricted passageway 66, to a volume 68, representing the regulator 14. The regulator 14 is connected to the ball valve 28 through a restricted passageway 70 and also to the valve 38 through a restricted passageway 72. The restricted passageways 70 and 72 represent the volume displaced by the safety check swivel assembly 34.

The ball valve 28 is connected through a restricted passageway 74 to a volume 76, volume 76 representing the tee 26. The pressure gauge 24 is interfaced with the volume 76. Volume 76 is also connected to the ball valve 30 through a restricted passageway 78 with the other side of the ball valve 30 being connected to a volume 80 through a restricted passageway 83. The volume 80 represents the customer's piping, supply lines, gas equipment, etc. For illustrative purposes, a leak is represented by an opening 84 in the volume 80.

It can be seen that when testing for a leak, the ball valve 28 and the ball valve 30 are open while the valve 38 is closed in addition to the stop valve 12 being open. Therefore, gas will flow from the inlet 64 through the volume 68 representing the regulator 14, and into the volume 76 and the volume 80. When the volume 76 and the volume 80 equalize, the pressure will be constant and will be registered by the gauge 24. At this time, the ball valve 28 is closed, the lock-stop valve 12 closed and the valve 38 opened. This allows the pressure in the volume 68 and the passageways 70 and 72 to be reduced to insure that any leaks in the ball valve 28 do not affect the integrity of the test. At this point, the leak, represented by the reference numeral 82, will result in a flow of gas from the volume 80 outward to the lower pressure environment. As can be appreciated, the pressure on the gauge 24 will be decreased over a period of time depending upon a number of factors. The first factor is the flow rate through the leak 82. The second factor is the overall volume. For a given flow rate through the leak 82, the initial rate of decrease in pressure will be a function primarily of the volume. The larger the volume, the slower the rate of decrease in pressure. Therefore, it is important to have some idea of the volume 80 when testing for a leak in order to determine the size of the leak from the flow rate. Without this knowledge, a standardized observation time could fail to detect a serious leak, given that the volume 80 is large enough. However, for most applications, especially residential shut-in tests, the volume 80 will be within certain constraints. For commercial applications, this may not be the case and it may therefore be desirable to determine roughly what the volume is.

Referring now to FIG. 4, there is illustrated an alternate embodiment wherein the actual flow of gas is measured, thus allowing the size of the leak to be determined. In the embodiment of FIG. 4, a flow meter 86 is inserted between the ball valve 30 and the adapter 36. The inlet to the flow meter 86 is connected to the outlet side of the ball valve 30 through a tube 88 and the outlet of the flow meter 86 is connected to the adapter 36 through a tube 90. The flow meter in the preferred embodiment is of the type manufactured by Waukee Engineering Co., Inc. as a type "S" flow-meter. The flow meter 86 basically has a body with a valve knob 92 on the upper end thereof and an indicator scale 94 on the lower end thereof. The indicator scale includes the scale and a float rod with an indicator on the end thereof. In operation, the indicator 94 provides an indication of the actual flow of gas therethrough. Flow meters can measure various flows and have various resolutions, depending on the level of the leak desired to be detected. The flow meter 86 can be selected therefore.

Referring now to FIG. 5, there is illustrated an alternate embodiment for measuring the flow through a leak. As described above, when the system is sealed off, a change in the pressure reading indicates that gas is leaking from some point in the sealed system. The rate of decrease in pressure can be utilized to determine the actual leak rate if the volume of the customer's piping is known within a certain degree of accuracy. Therefore, before any flow rate information can be determined from rate of pressure drop, it is necessary to roughly define the volume of the customer's piping. One method for doing this is to first pressurize the system and then allow gas to escape at a known rate, which known rate is substantially in excess of a normal leak. For example, the artificial leak rate could be on the order of 15 cubic feet per hour, whereas a normal leak may be on the order of 0.5 to 1.5 cubic feet per hour. It will be appreciated that the rate of decrease of the pressure will be greater for a small volume and lesser for a large volume.

In the embodiment of FIG. 5, there are three valves 100, 102 and 104 provided which are respectively connected to orifices 106, 108 and 110. Each of the orifices 106–110 provides a different flow rate.

In operation, the ball valve 30 is opened and the ball valve 28 is opened and the line pressurized. The ball valve 28 is then closed and one of the valves 100–104 opened, preferably the one with the smallest flow rate nozzles 106–110 attached thereto. Since the ball valve 30 remains open, the gauge 24 communicates with both the volume 76 and also the volume 80 (not shown), representing the customer's piping.

Once one of the valves 100–104 or any combination thereof are opened, the gauge 24 is observed for a predetermined amount of time. The deflection of the needle is noted over this time and a decision made as to the estimated volume. For example, the meter dial of gauge 24 can be divided into a number of graduations. If the nozzle 106 is sized such that the normal volume of the customer piping for residential service would result in a deflection of the needle on gauge 24 of four graduations over a period of thirty seconds, the correlation of this deflection with the opening of the appropriate valve 100-104 would confirm that that approximate volume was there. Alternatively, a given meter deflection can be defined as a function of time to determine the relative volume. For example, a meter deflection of 0.3 inches may require a time period of one minute to achieve, with the valve 100 in an open position. For a larger volume, this may require three minutes. A chart can be prepared which correlates directly to an amount of time for the meter to achieve a predetermined deflection. By providing a plurality of valves, the time for this test can be minimized by increasing the flow rate. It can be appreciated that the flow rate of any of the orifices 106-110 must be in excess of what would be considered a normal leak.

Once the approximate volume of the customer piping is known, the observation time for the gauge 24 can be determined. For example, in a residential connection, a small volume will typically be present and, therefore, an observation time of approximately two minutes would be sufficient. However, if the volume were significantly larger, such as for commercial installations, an additional observation time would be required.

Once a leak is detected as a result of the deflection of the needle on the gauge 24, the amount of this deflection can be converted into an actual flow rate, since the approximate volume of the customer's piping is known from the previous test. Therefore, the use of a calibrated dial on the gauge 24 and calibrated orifices that can be selectively interfaced with the volume 76 and the volume 80 of the customer piping, the flow rate can be measured. This flow rate is a function of the resolution of the gauge 24 and the amount of time that can be spent by a service technician at the installation.

Referring now to FIG. 6, there is illustrated a second alternate embodiment for measuring the flow rate through a leak. In the embodiment of FIG. 6, a calibrated orifice 112 is placed between the ball valve 28 and the meter 18. The orifice is sized such that the rate of fluid flow therethrough when both the customer's piping 80 and the volume 76 are pressurized will be greater than the rate of flow through the leak 82, the leak 82 being assumed to be a normal leak in the customer's piping 80. Typically, a flow rate of approximately 20 cubic feet per hour will be sufficient in the orifice 112.

In operation of the embodiment of FIG. 6, the ball valve 28 is initially closed and the ball valve 30 open. Thereafter, the ball valve 28 is opened such that gas flows through the orifice 112 to both the volume 76 and the volume 80 of the customer's piping. It can be appreciated that there will be low pressure on the customer's side of the orifice 112, thus providing an initially low pressure reading on the gauge 24. Prior to this measurement, the utilization pressure should be known to provide a pressure point for the final settling of the gauge 24. The gauge 24 is observed until the pressure increases to the utilization pressure and the gauge 24 stabilizes. This period of time can be directly correlated to the volume of the system, since the flow rate through the orifice 12, the volume to which it is flowing, i.e., the customer's piping and the pressure at which the gauge 24 comes to are the only variables, this enabling a service technician to determine the actual volume of the customer piping 80. Thereafter, the valve 28 is closed and the pressure gauge 24 observed to determine any drop in the pressure thereof. It is the rate of this pressure drop that determines the leak rate or, more particularly, the amount of gas that leaks from the combined lines 80 and 76. This will therefore give an indication of the actual leak rate.

In summary, there has been provided a leak detector that provides the capability for a service technician to perform a shut-in test procedure at an installation to check the regulator function and meter function and to provide a leak test. With two isolation valves that are disposed in series and between the meter and the customer's piping, a gauge disposed therebetween can be utilized to determine utilization pressure, the lock-up set point of the regulator and also perform a leak test. By isolating the gauge from the customer piping and allowing it to communicate with the meter, the utilization pressure can be measured first with a load placed on the system and, then with the load removed from the system, the lock-up setpoint can be determined for the regulator. By isolating the gauge from the meter, and allowing it to communication with the customer's piping in a pressurized situation, observation of the gauge allows for leak testing of the system.

Although the preferred embodiment has been described in detail, it should be understood that various changes, substitutions and alterations can be made therein without departing from the spirit and scope of the invention as defined by the appended claims.

What is claimed is:

1. A method for performing a set-up procedure for a gas service that is connected to a customer's piping, comprising:
   providing an intermediate volume;
   providing a pressure measuring device in communication with the intermediate volume to allow measurement of the pressure thereof;
   connecting the intermediate volume between a gas supply associated with the gas service and the customer's piping;
   pressurizing the customer's piping through the intermediate volume;
   isolating the intermediate volume from the gas supply such that the intermediate volume remains in communication with the customer's piping;
   observing the pressure measuring device for a predetermined amount of time, a reduction in pressure indicating the presence of a leak;
   removing the intermediate volume from between the gas supply and the customer's piping and connecting the customer's piping to the gas supply; and
   measuring utilization pressure prior to pressurizing the customer's piping through the intermediate volume, the steps of measuring utilization pressure comprising:
      isolating the intermediate volume from the customer's piping,
      connecting the gas supply to the intermediate volume,
      allowing gas to escape from the intermediate volume at a predetermined rate, and
      measuring the pressure in the intermediate volume.

2. The method of claim 1 and further comprising measuring fluid flow to a customer's piping from the intermediate volume.

3. The method of claim 2 wherein the step of measuring fluid flow comprises disposing a series fluid flow meter between the intermediate volume and the customer's piping.

4. The method of claim 3 and further comprising measuring the approximate volume of the customer's piping prior to measuring the leak.

5. The method of claim 2 wherein the step of measuring the fluid flow comprises:
pressurizing the intermediate volume and the customer's piping;
observing the rate of the decrease of pressure in the intermediate volume; and
correlating the rate of the decrease with a known decrease rate to determine the size of a leak.

6. A method for performing a set-up procedure for a gas service that is connected to a customer's piping, comprising:
providing an intermediate volume;
providing a pressure measuring device in communication with the intermediate volume to allow measurement of the pressure thereof;
connecting the intermediate volume between a gas supply associated with the gas service and the customer's piping;
pressurizing the customer's piping through the intermediate volume;
isolating the intermediate volume from the gas supply such that the intermediate volume remains in communication with the customer's piping;
observing the pressure measuring device for a predetermined amount of time, a reduction in pressure indicating the presence of a leak;
removing the intermediate volume from between the gas supply and the customer's piping and connecting the customer's piping to the gas supply;
wherein a gas meter is disposed in the gas supply at the point where the supply is operable to be connected to the customer's piping; and
further comprising checking the operation thereof by the steps of:
isolating the intermediate volume from the customer's piping,
interfacing the intermediate volume with the gas supply through the gas meter,
allowing gas to escape from the intermediate volume at a predetermined flow rate, and
observing the gas meter to determine that the gas meter registers a predetermined gas level in accordance with the volume of gas escaping at the predetermined flow rate.

7. An apparatus for performing a set-up test procedure for a gas service that is connected to the customer's piping, comprising:
an intermediate volume of a predetermined size;
a pressure measuring device disposed in communication with said intermediate volume to allow measurement of the pressure thereof;
a first valve for being connected on one side thereof to said intermediate volume to allow isolation of said intermediate volume;
a first interface for connecting said intermediate volume to the customer's piping;
a second interface for connecting the other side of said first valve to the gas service;
wherein said first valve is operable to be in an open position to connect the gas service to said intermediate volume and also the customer's piping to allow pressurization thereof and to be closed after pressurization to allow said pressure measuring device to be observed for a predetermined amount of time to determine if a leak exists in the customer's piping;
a second valve disposed between said intermediate volume and said first interface such that it is placed between said intermediate volume and the customer's piping;
a third valve having one side thereof of in communication with said intermediate volume;
an orifice having a predetermined flow rate for being disposed on the opposite side of said third valve from said intermediate volume;
wherein said second valve is operable to be closed when said first and third valves are open such that a utilization pressure can be measured; and
wherein said second valve is operable to be closed after pressurization of said intermediate volume and said third valve is operable to be closed to provide an indication on said pressure measuring device of the operation of the gas service regulated pressure.

8. The apparatus of claim 7 wherein the gas service includes a gas cut-off valve for inhibiting gas flow to said intermediate volume wherein said gas cut-off valve is operable to be cut off during observation of said meter.

9. The apparatus of claim 7 and further comprising:
a low flow rate orifice of a predetermined and low flow rate for being disposed in communication with said intermediate volume;
said low flow rate orifice providing an indication of a low flow rate form the gas service, when said first valve is open and said second valve is closed and said third valve is closed, such that gas escaping through said low flow rate orifice will provide an indication of low volume readings for the gas service.

10. The apparatus of claim 7 wherein said pressure measuring device comprises a pressure gauge connected to said intermediate volume.

11. The method of claim 7 and further comprising a flow measuring device disposed in series with said intermediate volume and said first interface to measure flow rate therethrough.

12. The apparatus of claim 7 and further comprising means for measuring the approximate volume of the customer's piping.

13. An apparatus for performing a set-up test procedure for a gas service that is connected to the customer's piping, comprising:
an intermediate volume of a predetermined size;
a pressure measuring device disposed in communication with said intermediate volume to allow measurement of the pressure thereof;
a first valve for being connected on one side thereof to said intermediate volume to allow isolation of said intermediate volume;
a first interface for connecting said intermediate volume to the customer's piping;
a second interface for connecting the other side of said first valve to the gas service;
wherein said first valve is operable to be in an open position to connect the gas service to said intermediate volume and also the customer's piping to allow pressurization thereof and to be closed after pressurization to allow said pressure measuring device to be observed for a predetermined amount of time to determine if a leak exists in the customer's piping;

wherein the gas service includes a gas cut-off valve for inhibiting gas flow to said intermediate volume wherein said gas cut-off valve is operable to be cut off during observation of said meter; and a bleed valve disposed between said gas cut-off valve and said first valve to bleed pressure form the other side of said first valve when said first valve and said gas cut-off valve are closed.

* * * * *